United States Patent
Pitarch López et al.

(10) Patent No.: US 8,623,579 B2
(45) Date of Patent: Jan. 7, 2014

(54) EASILY DISPERSIBLE PIGMENT PREPARATION BASED ON C.I. PIGMENT YELLOW 155

(75) Inventors: Jesús Pitarch López, Frankfurt am Main (DE); Ulrike Rohr, Weinheim (DE); Kristin Richter, Mainz (DE); Eusebio Ruiz Fernandez, Bad Soden am Taunus (DE); Ruediger Baur, Eppstein-Niederjosbach (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/500,376

(22) PCT Filed: Sep. 22, 2010

(86) PCT No.: PCT/EP2010/005799
§ 371 (c)(1),
(2), (4) Date: May 4, 2012

(87) PCT Pub. No.: WO2011/042120
PCT Pub. Date: Apr. 14, 2011

(65) Prior Publication Data
US 2012/0282543 A1    Nov. 8, 2012

(30) Foreign Application Priority Data
Oct. 7, 2009  (DE) .......................... 10 2009 048 542

(51) Int. Cl.
*G03G 9/087* (2006.01)
*G03G 9/09* (2006.01)
*C08K 5/23* (2006.01)

(52) U.S. Cl.
USPC ..................................... 430/108.23; 524/190

(58) Field of Classification Search
USPC ..................................... 430/108.23; 524/190
See application file for complete search history.

(56) References Cited

U.S. PATENT DOCUMENTS

| | | | |
|---|---|---|---|
| 3,708,290 A * | 1/1973 | Verhille et al. .................. | 430/89 |
| 4,299,898 A | 11/1981 | Williams et al. | |
| 4,639,403 A | 1/1987 | Podszun et al. | |
| 6,117,606 A | 9/2000 | Macholdt et al. | |
| 6,504,045 B2 | 1/2003 | Jung et al. | |
| 6,602,342 B2 | 8/2003 | Schmidt et al. | |
| 7,118,623 B2 | 10/2006 | Bach et al. | |
| 7,297,200 B2 | 11/2007 | Wuzik et al. | |
| 7,311,769 B2 | 12/2007 | Weber et al. | |
| 7,384,472 B2 | 6/2008 | Schweikart et al. | |
| 7,709,614 B2 | 5/2010 | Schmidt et al. | |
| 7,824,488 B2 | 11/2010 | Borchert et al. | |

FOREIGN PATENT DOCUMENTS

| | | |
|---|---|---|
| EP | 0022746 | 1/1981 |
| EP | 0168748 | 1/1986 |
| EP | 0908789 | 4/1999 |

OTHER PUBLICATIONS

PCT International Search Report for PCT/EPO 2010/005799, mailed Feb. 15, 2012.
English Translation of the PCT International Preliminary Report on Patentability for PCT/EP 2010/005799, mailed Apr. 19, 2012.

* cited by examiner

*Primary Examiner* — Hoa V Le
(74) *Attorney, Agent, or Firm* — Anthony A. Bisulca

(57) ABSTRACT

The invention relates to a solid pigment preparation containing
A) 5% to 99% by weight of PY 155 and
B) 1% to 95% by weight of copolymer containing the following structural units:
(i) 1 to 70 mol % of structural unit B1

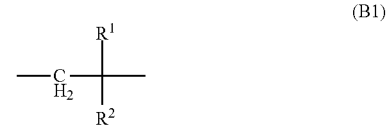

(B1)

(ii) 1 to 70 mol % of structural unit B2

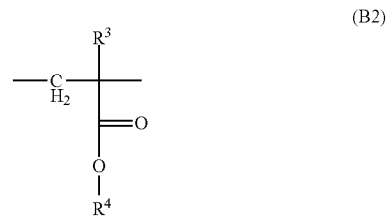

(B2)

(iii) 1 to 70 mol % of structural unit B3

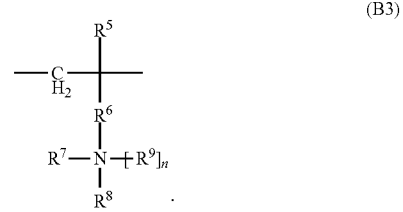

(B3)

15 Claims, No Drawings

EASILY DISPERSIBLE PIGMENT PREPARATION BASED ON C.I. PIGMENT YELLOW 155

The present invention resides in the field of easily dispersible pigment preparations, especially for uses in electrophotographic toners and developers. It is known to surface modify pigments with pigment derivatives and low molecular weight compounds, but performance as regards good dispersibility in the application medium is frequently inadequate and requires a specific choice of polymer envelope.

EP-A-0 908 789 discloses using C.I. Pigment Yellow 155 as a yellow pigment in electrophotographic toners and developers, powder coatings and color filters. Electrophotographic processes of recording involve the production of a "latent charge image" on a photoconductor. This "latent charge image" is developed by applying an electrostatically charged toner, which is then transferred to paper, textiles, foils or plastic for example and fixed using pressure, radiation, heat or solvent action for example. Typical toners are one- or two-component powder toners (also called one- or two component developers), as well as specialty toners, for example magnetic toners, liquid toners or polymerization toners. Polymerization toners are formed for example by suspension polymerization (condensation) or emulsion polymerization and lead to improved particulate properties on the part of the toner. The meaning further extends to toners produced in nonaqueous dispersions.

The traditional way to produce toners for developing electrostatic images is by mixing the ingredients such as pigment, vehicle resin (toner binder) and other toner ingredients in the melt (in an extruder for example) and subsequent grinding and sifting.

In recent years, the focus has been more and more on chemical ways to produce toners. There are many different processes for producing these so-called "chemical toners". These comprise for example suspension or emulsion polymerizations, solution-dispersion processes and aggregation processes. In contradistinction to the classic process of mixing in the melt, the chemical toner production processes generally involve dispersal of the ingredients in liquids (water, solvent, monomer mixtures). This imposes new requirements on the ingredients used, especially the pigments and charge control agents, since they can have a decisive influence on the chemical toner production process.

One important aspect with processes taking place in a two-phase system (as with suspension or emulsion polymerization for example) is, for example, the affinity of toner ingredients for the particular phases. In suspension polymerization, for example, the toner ingredients are desired to remain in the monomeric phase and not pass into the aqueous phase. This is the only way to ensure that, after the polymerization has taken place, the toner ingredients are actually present in the final particles of toner. It is further the case that all the components have an influence on the physical properties (such as the viscosity for example) of the liquid phases and hence on the formation of the monomer droplets wherein the polymerization takes place.

The problem addressed by the present invention was that of providing a pigment preparation based on P.Y. 155 that is useful in chemical toner production processes.

The purpose was to use a simple and economical process to produce a pigment preparation which, on dispersal in monomer mixtures customary for chemical toner processes, exhibits good dispersibility (rapid color strength development at low shearing forces), provides a low viscosity on the part of the pigment dispersion and also has high hydrophobicity.

No P.Y. 155 pigment preparation known for coloration of plastics, for production of liquid or other printing inks, of coatings or in conventional toner processes is capable of adequately satisfying all these properties.

Surprisingly, the pigment preparation described hereinbelow was found to meet the abovementioned requirements.

The present invention provides solid pigment preparations containing

A) 5% to 99% by weight, preferably 40% to 95% by weight, of an azo pigment of formula (1)

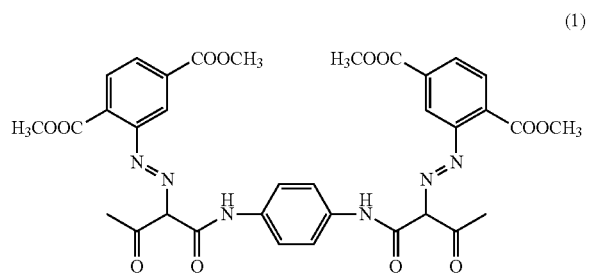

(B) 1% to 95% by weight, preferably 5% to 60% by weight, of a copolymer containing the following structural units:

(i) 1 to 70 mol %, preferably 5 to 60 mol %, of structural unit B1

(ii) 1 to 70 mol %, preferably 5 to 60 mol %, of structural unit B2

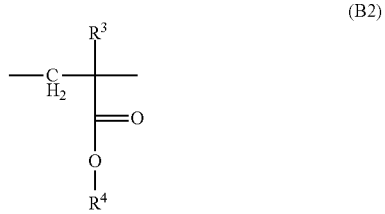

(iii) 1 to 70 mol %, preferably 5 to 60 mol %, of structural unit B3

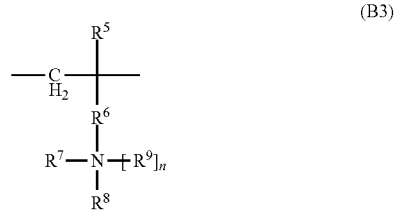

where
$R^1$, $R^3$ and $R^5$ are each independently hydrogen or $C_1$-$C_4$-alkyl,
$R^2$ is $C_1$-$C_{60}$-alkyl, $C_6$-$C_{18}$-aryl, $C_1$-$C_4$-alkylene-$C_6$-$C_{12}$-aryl or $C_3$-$C_{18}$-hetaryl, $R^4$ is linear or branched $C_1$-$C_{40}$-alkyl, $C_5$-$C_{30}$-cycloalkyl, $C_1$-$C_4$-alkylene-$C_6$-$C_{12}$-aryl or $C_6$-$C_{30}$-aryl, $R^6$ is —COO—$(CH_2)_p$—, p is between 1 and 8, $R^7$, $R^8$ and $R^9$ are each independently hydrogen, linear or branched $C_1$-$C_{40}$-alkyl, $C_5$-$C_{30}$-cycloalkyl, $C_6$-$C_{30}$-aryl or benzyl, and n is between zero and 1, preferably 0.5 to 0.99.

The number n represents the degree of quaternization of the amine group and is between 0 and 100 mol % and preferably between 50 and 99 mol %.

The aforementioned alkyl, cycloalkyl and aryl radicals may optionally be substituted. Suitable substituents are for example ($C_1$-$C_6$)-alkyl, halogens, such as fluorine, chlorine, bromine and iodine, preferably chlorine, hydroxyl and ($C_1$-$C_6$)-alkoxy.

$R^1$, $R^3$ and $R^5$ are each preferably hydrogen or methyl.

$R^2$ is preferably $C_6$-$C_{30}$-alkyl, $C_6$-$C_{10}$-aryl, benzyl, five- or six-membered aromatic nitrogen-containing $C_3$-$C_9$-heterocycles.

$R^4$ is preferably $C_1$-$C_{20}$-alkyl, $C_5$-$C_6$-cycloalkyl, benzyl, phenyl or naphthyl.

P is preferably 1, 2, 3, 4, 5 or 6.

$R^7$, $R^8$ and $R^9$ are each preferably hydrogen, $C_1$-$C_8$-alkyl, $C_5$-$C_6$-cycloalkyl, phenyl and benzyl.

The invention further provides a pigment preparation characterized in that the copolymer (B) consists of (i) structural unit B1 to an extent from 1 to 70 mol %, preferably 5 to 60 mol %.

(ii) structural unit B2 to an extent from 1 to 70 mol %, preferably 5 to 60 mol %, and (iii) structural unit B3 to an extent from 1 to 70 mol %, preferably 5 to 60 mol %.

Structural unit B1 derives from the alpha,beta-unsaturated olefins of the general formula (b1).

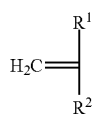

The following alpha,beta-unsaturated olefins may be mentioned by way of example:

styrene, alpha-methylstyrene, dimethylstyrene, alpha-ethylstyrene, diethylstyrene, i-propylstyrene, tert-butylstyrene, 1-vinylimidazole, 2-vinylpyridine and alpha-olefins, such as decene, dodecene, tetradecene, pentadecene, hexadecene, octadecene, $C_{20}$-alpha-olefin, $C_{24}$-alpha-olefin or $C_{30}$-alpha-olefin.

Structural unit B2 derives from esters of ethylenically unsaturated monocarboxylic acids of the general formula (b2).

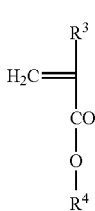

Examples thereof are: methyl (meth)acrylate, ethyl (meth)acrylate, propyl (meth)acrylate, isopropyl (meth)acrylate, n-butyl (meth)acrylate, t-butyl (meth)acrylate, pentyl (meth)acrylate, hexyl (meth)acrylate, 2-ethylhexyl (meth)acrylate, 2-hydroxyethyl (meth)acrylate, nonyl (meth)acrylate, lauryl (meth)acrylate, cyclohexyl (meth)acrylate, isobornyl (meth)acrylate, phenyl (meth)acrylate, naphthyl (meth)acrylate and benzyl (meth)acrylate.

Structural unit B3 derives from esters of ethylenically unsaturated monocarboxylic acids of the general formula (b3), which can be quaternized before or after polymerization.

The following monomers may be mentioned as an example thereof: 2-aminoethyl (meth)acrylate, N,N-diethylaminoethyl (meth)acrylate, N,N-dimethylaminoethyl (meth)acrylate, N,N-dipropylaminoethyl (meth)acrylate, N,N-dibutylaminoethyl (meth)acrylate, N,N-dihexylaminoethyl (meth)acrylate, N,N-diethylaminobutyl (meth)acrylate, N,N-dimethylaminobutyl (meth)acrylate, N,N-dipropylaminobutyl (meth)acrylate, N,N-dibutylaminobutyl (meth)acrylate, N,N-dihexylaminobutyl (meth)acrylate, N,N-diethylaminopropyl (meth)acrylate, N,N-dimethylaminopropyl (meth)acrylate, N,N-dipropylaminopropyl (meth)acrylate, N,N-dibutylaminopropyl (meth)acrylate, N,N-dihexylaminopropyl (meth)acrylate, N,N-diethylaminohexyl (meth)acrylate, N,N-dimethylaminohexyl (meth)acrylate, N,N-dipropylaminohexyl (meth)acrylate, N,N-dibutylaminohexyl (meth)acrylate and N,N-dihexylaminohexyl (meth)acrylate.

Useful quaternizing agents are all kinds of organic and inorganic acids and/or alkylating agents, for example methyl iodide, dimethyl sulfate or benzyl chloride.

The copolymers are known per se and are obtainable via methods of polymerization which are known to a person skilled in the art, especially by free-radical polymerization. The copolymers are further obtainable via controlled methods of polymerization which are known to a person skilled in the art, for example "Reversible Addition Fragmentation Chain Transfer Process" (RAFT), "Nitroxide-Mediated Polymerisation" (NMP), "Atom Transfer Radical Polymerization" (ATRP) and "Group Transfer Polymerization" (GTP). The molar mass of suitable copolymers is preferably between 1000 and 100 000 g/mol. Particularly suitable copolymers have molar masses between 2000 and 30 000 g/mol. The copolymers may have a random, an alternating, a gradient-type or a block-type construction.

C.I. Pigment Yellow 155 is usable in commercially available qualities and its $d_{50}$ particle size in the pigment preparation according to the invention is preferably in the range from 30 to 500 nm and preferably in the range from 50 to 350 nm.

The pigment preparations according to the invention may contain customary auxiliaries from the group of fillers, flame retardants, preservatives, photoprotectants, pigmentary and nonpigmentary dispersants, surfactants, antioxidants, resins, waxes, defoamers, antistats or charge control agents, preferably in the customary amounts of 0.1% to 20% by weight, based on the total weight of the pigment preparation.

The present invention further provides a process for producing the above-described, solid pigment preparations, characterized in that the pigment of formula (1) is mixed as powder, granulate, presscake or suspension with at least one copolymer (B) and optionally said customary auxiliaries in the presence of water or of an organic solvent or of a mixture of water and organic solvent and subsequently isolated in solid form.

The pigment preparation according to the invention is advantageously produced by an aqueous pigment suspension being stirred together with the copolymer and subsequently filtered off, dried and pulverized. The hereinbelow-described process steps (dispersal and/or finishing in the presence of the copolymer) can be advantageous depending on the product property desired, but are not absolutely essential.

A particularly advantageous form of mixing can be achieved by using a grinding or dispersing assembly. As such, stirred systems, dissolvers (saw-tooth stirrers), rotor-stator mills, ball mills, stirred media mills, such as sand and bead mills, high-speed mixers, kneading apparatus, roll stands or high-performance bead mills can be used.

The fine dispersal/grinding of the pigment preparation according to the invention is carried on to the desired particle size distribution and can take place at temperatures in the range from 0 to 100° C., advantageously at a temperature between 10 and 70° C., preferably at 20 to 60° C.

The finely dispersed pigment preparation thus obtained can further be subjected to a finishing operation. The finishing operation is advantageously carried out in the given organic solvent, water or water-solvent mixture at a temperature of 50 to 250° C., particularly 70 to 200° C., especially 100 to 190° C., and advantageously for a period in the range from 5 minutes to 24 hours, particularly 5 minutes to 18 hours and especially 5 minutes to 6 hours. The finishing operation is preferably carried out at boiling temperature, even in the case of temperatures above the boiling point of the solvent system under pressure. When a purely aqueous pigment dispersion is preferable, any solvent used can be removed by means of a steam distillation.

The pigment preparation according to the invention is isolated in solid form, for example by filtration, decanting, centrifugation, spray drying, fluidized bed drying, belt drying, spray granulation or drying in a paddle dryer. The pigment preparation according to the invention is preferably isolated by filtration and final drying. When the pigment preparation obtained has a coarse particle size, it is advantageous to subject it to an additional grinding operation, for example dry grinding.

The pigment preparation according to the invention has a higher hydrophobicity and a lower viscosity of the pigment dispersion, compared with conventional P.Y. 155, and therefore is better at meeting the requirements of the production process for chemical toners.

The pigment preparation according to the invention is useful as a colorant in electrophotographic toners and developers, for example one- or two-component powder toners (also known as one- or two-component developers), magnetic toners, liquid toners, latex toners, polymerization toners and also specialty toners. In a colored toner, the pigment preparation according to the invention can be used as sole colorant or combined with other yellow colorants, but also for shading other hues with colorants of other hues.

To produce colored electrophotographic toners, including as color combination of two or more of black, cyan, yellow, magenta, green, orange, red and blue, colorants such as organic color pigments, inorganic pigments or dyes are added, typically in the form of powders, dispersions, presscakes, solutions or masterbatches. The organic color pigments may be from the group of azo pigments or polycyclic pigments or solid solutions of such pigments.

Preferred blue and/or green pigments are copper phthalocyanines, such as C.I. Pigment Blue 15, 15:1, 15:2, 15:3, 15:4, 15:6, P. Blue 16 (metal-free phthalocyanine), or phthalocyanines with aluminum, nickel, iron or vanadium as central atom, also triarylcarbonium pigments, such as Pigment Blue 1, 2, 9, 10, 14, 60, 62, 68, 80, Pigment Green 1, 4, 7, 45; orange pigments, e.g., P.O. 5, 62, 36, 34, 13, 43, 71; yellow pigments, e.g., P.Y. 12, 13, 14, 17, 74, 83, 93, 97, 111, 122, 139, 151, 155, 180, 174, 175, 185, 188, 191, 213, 214, red pigments, e.g., P.R. 48, 57, 122, 146, 147, 149, 150, 184, 185, 186, 202, 207, 209, 238, 254, 255, 269, 270, 272, violet pigments such as P.V. 1, 19, carbon black, iron-manganese oxides; further solid solutions of C.I. Pigment Violet 19 and C.I. Pigment Red 122.

Mixtures with organic dyes are commendable for enhancing the brilliance in particular, but also for shading the hue. Preferable organic dyes are: water-soluble dyes, e.g., direct, reactive and acid dyes, and also solvent-soluble dyes, e.g., solvent dyes, disperse dyes and vat dyes. Examples are: C.I. Reactive Yellow 37, Acid Yellow 23, Reactive Red 23, 180, Acid Red 52, Reactive Blue 19, 21, Acid Blue 9, Direct Blue 199, Solvent Yellow 14, 16, 25, 56, 62, 64, 79, 81, 82, 83, 83:1, 93, 98, 133, 162, 174, Solvent Red 8, 19, 24, 49, 89, 90, 91, 92, 109, 118, 119, 122, 124, 127, 135, 160, 195, 212, 215, Solvent Blue 44, 45, Solvent Orange 41, 60, 63, Disperse Yellow 64, Vat Red 41, Solvent Black 45, 27.

The present invention also provides an electrophotographic toner containing 30% to 99.99% by weight and preferably 40% to 99.5% by weight of a customary binder, for example addition-polymerization, polyaddition and polycondensation resins, such as styrene, styrene acrylate, styrene-butadiene, acrylate, polyester, phenolic epoxy resins, polysulfones, polyurethanes, polyethylene, polypropylene, cycloolefin copolymers or biobased polymers (produced from renewable raw materials such as soy beans or maize) or combination thereof, 0.001% to 50% by weight and preferably 0.05% to 20% by weight of pigment preparation according to the invention, optionally 0.001% to 50% by weight and preferably 0.05% to 20% by weight of a further colorant, optionally 0.01% to 50% by weight and preferably 0.01% to 20% by weight of a wax, and optionally 0.01% to 50% by weight, preferably 0.05% to 20% by weight and more preferably 0.1% to 5% by weight of at least one charge control agent, all based on the total weight of the electrophotographic toner.

The pigment preparation according to the invention is further useful as a colorant in powders and powder coatings, especially in triboelectrically or electrokinetically sprayable powder coatings used for surface coating of articles composed for example of metal, wood, plastic, glass, ceramic, concrete, textile material, paper or rubber.

Useful powder coating resins are typically epoxy resins, carboxyl- and hydroxyl-containing polyester resins, polyurethane and acrylic resins together with customary hardeners. Combinations of resins are also used. For instance, epoxy resins are frequently used in combination with carboxyl- and hydroxyl-containing polyester resins. Typical hardener components (depending on the resin system) are for example acid anhydrides, imidazoles and also dicyandiamide and their derivatives, blocked isocyanates, bisacylurethanes, phenolic and melamine resins, triglycidyl isocyanurates, oxazolines and dicarboxylic acids.

The pigment preparation according to the invention is also useful as a colorant in ink-jet inks on an aqueous or nonaqueous basis, microemulsion inks, UV inks and also in such inks as function according to the hot-melt process.

Ink-jet inks generally contain altogether 0.5% to 50% by weight and preferably 1% to 25% by weight, (reckoned dry) of the pigment preparation according to the invention.

Microemulsion inks are based on organic solvents, water and optionally an additional hydrotropic substance (interface compatibilizer). Microemulsion inks contain in general from 0.5% to 15% by weight and preferably from 1.5% to 8% by weight of pigment preparation according to the invention, from 5% to 99% by weight of water and from 0.5% to 94.5% by weight of organic solvent and/or hydrotropic compound.

Solvent-based ink-jet inks preferably contain 0.5% to 15% by weight of pigment preparation according to the invention, 85% to 99.5% by weight of organic solvent and/or hydrotropic compounds. Typical organic solvents are esters, ketones, acetates, alcohols, individually or in admixtures.

Hot melt inks are usually based on waxes, fatty acids, fatty alcohols or sulfonamides that are solid at room temperature and liquefy on heating, the preferred melting range being between about 60° C. and about 140° C. Hot-melt ink-jet inks consist for example essentially of 20% to 90% by weight of wax and 1% to 10% by weight of pigment preparation according to the invention. They may further contain from 0% to 20% by weight of an additional polymer (as "dye dissolver"), from 0% to 5% by weight of dispersing assistant, from 0% to 20% by weight of viscosity modifier, from 0% to 20% by weight of plasticizer, from 0% to 10% by weight of tackifier additive, from 0% to 10% by weight of transparency stabilizer (prevents crystallization of waxes for example) and also from 0% to 2% by weight of antioxidant.

UV inks typically consist of monomers of low molecular weight mono-, di-, tri-, tetra- and/or pentafunctional acrylates and/or acrylate-, urethane-, epoxy- or polyester-based oligomers. UV inks are typically crosslinked following cationic, anionic or free-radical initiation.

The pigment preparation according to the invention is further useful as a colorant for color filters, not only for additive but also subtractive color production, and also as a colorant for ("electronic inks" or "e-inks") or "electronic paper" ("e-paper"). To produce so-called color filters, not only reflective but also transparent color filters, pigments are applied to the particular LCD components (e.g., TFT-LCD=Thin Film Transistor Liquid Crystal Displays or e.g. ((S) TN-LCD=(Super) Twisted Nematic-LCD) in the form of a paste or as pigmented photoresists in suitable binders (acrylate salts, acrylic esters, polyimides, polyvinyl alcohols, epoxies, polyesters, melamines, gelatin, caseines). In addition to high thermal stability, high pigment purity is another prerequisite for a stable paste or a pigmented photoresist. In addition, the pigmented color filters can also be applied by ink-jet printing processes or other suitable printing processes.

The pigment preparation according to the invention is naturally also useful for pigmentation and dyeing of natural and synthetic materials of any kind, especially paints, coating systems, such as wallpaper colors, printing inks, emulsion and gloss colors, which are water and/or solvent containing.

The pigment preparation according to the invention is further useful for coloration of macromolecular materials of any kind, for example natural and synthetic fiber materials, preferably cellulose fibers, also for paper pulp coloration and for laminate coloration. Further applications are the production of printing inks, for example textile printing, flexographic printing, decor printing or intaglio printing inks, wallpaper colors, water-thinnable coatings, wood protection systems, viscose dope dyeings, finishes, sausage casings, seed, fertilizer, glass, especially glass bottles, and also for mass coloration of roof tiles, for coloration of renders, concrete, wood stains, colored pencil leads, felt tip pens, waxes, paraffins, graphics inks, ball point pen pastes, chalks, washing and cleaning compositions, shoe care agents, latex products and abrasives.

The pigment preparation according to the invention can also be used for printing various kinds of coated or uncoated substrate materials, for example for printing paperboard, cardboard, wood and woodbase materials, metallic materials, semiconductor materials, ceramic materials, glasses, glass and ceramic fibers, inorganic materials of construction, concrete, leather, food, cosmetics, skin and hair. The substrate material in question may be two-dimensionally planar or spatially dimensioned, i.e., three-dimensionally configured and may be printed or coated either completely or only partially.

General prescription for producing the inventive pigment preparation:

60 g of commercially available C.I. Pigment Yellow 155 (Toner® Yellow 3GP) in the form of a water-moist presscake (35% by weight) were mixed with 6.8 g of the final copolymer in 1000 g of water at 50° C. for 1 hour. The surface-coated pigment was subsequently filtered off and washed with water to a conductivity (filtrate)<0.5 mS/cm. The coated pigment was dried at 80° C. in a circulating air drying cabinet and then pulverized. 65 g of pigment preparation were obtained.

EXAMPLES 1 to 6

Prepared according to the general prescription by addition of copolymers 1 to 6 from Table 1.

Control example: no copolymer was added.

TABLE 1

| | Composition of (final) copolymers | | |
|---|---|---|---|
| Copolymer | Monomer 1 (mol %) | Monomer 2 (mol %) | Monomer 3 (mol %) |
| 1 | 35% ST | 35% BMA | 30% DMAEMA-Bz |
| 2 | 44% ST | 20% MMA | 36% DMAEMA |
| 3 | 44% ST | 20% EHMA | 36% DMAEMA |
| 4 | 35% ST | 35% HEMA | 30% DMAEMA |
| 5 | 35% ST | 35% IBMA | 30% DMAEMA |
| 6 | 15% VI | 60% MMA | 25% DMAEMA |

IBMA = isobornyl methacrylate
ST = styrene
BMA = n-butyl methacrylate
MMA = methyl methacrylate
DMAEMA = N,N-dimethylaminoethyl methacrylate
DMAEMA-Bz = N,N-dimethylaminoethyl methacrylate quaternized with benzyl chloride
EHMA = 2-ethylhexyl methacrylate
HEMA = 2-hydroxyethyl methacrylate
VI = vinylimidazole Test Methods:

1. Viscosity:

The pigment preparation is dispersed in styrene at 5% on a paint shaker by addition of glass beads. After removal of the glass beads using a sieve, a comb-plate viscometer is used to record a viscosity curve (T=23° C., shear rate 0-250 s$^{-1}$ in 60 sec) for this dispersion. The table reports the values at a shear rate of 250 s$^{-1}$.

2. Hydrophobicity:

0.1 g of pigment is added to 10 g of water. What is observed is whether the pigment remains on the water surface (hydrophobicity high) or is wetted by the water and sinks to the bottom (hydrophobicity low). Thereafter, the pigment-water mixture is briefly shaken by hand and then visually assessed once more.

Assessment:

++=very high hydrophobicity (pigment does not wet and remains on the water surface), +=high hydrophobicity (largest proportion of sample quantity remains on the water surface, coloration of aqueous phase), −=low hydrophobicity (pigment wets with water and sinks to bottom)

| Sample | Viscosity (mPas) | Hydrophobicity before shaking (visual) | Hydrophobicity after shaking (visual) |
|---|---|---|---|
| Example 1 | 120 | ++ | ++ |
| Example 2 | 130 | ++ | ++ |
| Example 3 | 119 | ++ | ++ |
| Example 4 | 127 | ++ | + |
| Example 5 | 110 | ++ | ++ |
| Example 6 | 130 | ++ | ++ |
| Control | 148 | ++ | + |

What is claimed is:

1. A solid pigment preparation comprising

A) 5% to 99% by weight of an azo pigment of formula (1)

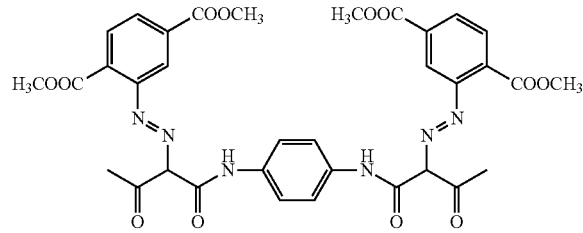

(1)

(B) 1% to 95% by weight of a copolymer containing the following structural units:

(i) 1 to 70 mol % of structural unit B1

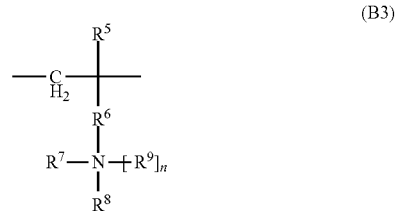

(B1)

(ii) 1 to 70 mol % of structural unit B2

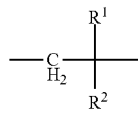

(B2)

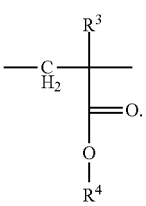

(iii) 1 to 70 mol % of structural unit B3

(B3)

wherein $R^1$, $R^3$ and $R^5$ are each independently hydrogen or $C_1$-$C_4$-alkyl, $R^2$ is $C_1$-$C_{60}$-alkyl, $C_6$-$C_{18}$-aryl, $C_1$-$C_4$-alkylene-$C_6$-$C_{12}$-aryl or $C_3$-$C_{18}$-hetaryl, $R^4$ is linear or branched $C_1$-$C_{40}$-alkyl, $C_6$-$C_{30}$-cycloalkyl, $C_1$-$C_4$-alkylene-$C_6$-$C_{12}$-aryl or $C_6$-$C_{30}$-aryl, $R^6$ is —COO—$(CH_2)_p$—, p is between 1 and 8, $R^7$, $R^8$ and $R^9$ are each independently hydrogen, linear or branched $C_1$-$C_{40}$-alkyl, $C_5$-$C_{30}$-cycloalkyl, $C_6$-$C_{30}$-aryl or benzyl, and n is between zero and 1.

2. The pigment preparation as claimed in claim 1, containing (A) 40% to 95% by weight of an azo pigment of formula (1), and (B) 5% to 60% by weight of the copolymer.

3. The pigment preparation as claimed in claim 1, wherein the copolymer (B) contains (i) 5 to 60 mol % of structural unit B1, (ii) 5 to 60 mol % of structural unit B2, and (iii) 5 to 60 mol % of structural unit B3.

4. The pigment preparation as claimed in claim 1, wherein the copolymer (B) consists of (i) structural unit B1 to an extent from 1 to 70 mol %, (ii) structural unit B2 to an extent from 1 to 70 mol %, and (iii) structural unit B3 to an extent from 1 to 70 mol %.

5. The pigment preparation as claimed in claim 1, wherein the copolymer (B) consists of (i) structural unit B1 to an extent from 5 to 60 mol %, (ii) structural unit B2 to an extent from 5 to 60 mol %, and (iii) structural unit B3 to an extent from 5 to 60 mol %.

6. The pigment preparation as claimed in claim 1, $R^1$, $R^3$ and $R^5$ are the same or different and are each hydrogen or methyl.

7. The pigment preparation as claimed in claim 1, wherein $R^2$ is $C_6$-$C_{30}$-alkyl, $C_8$-$C_{10}$-aryl, benzyl or five- or six-membered aromatic nitrogen-containing $C_3$-$C_9$-heterocycles.

8. The pigment preparation as claimed in claim 1, wherein $R^4$ is $C_1$-$C_{20}$-alkyl, $C_5$-$C_6$-cycloalkyl, benzyl, phenyl or naphthyl.

9. The pigment preparation as claimed in claim 1, wherein $R^7$, $R^8$ and $R^9$ are the same or different and are each hydrogen, $C_1$-$C_8$-alkyl, $C_5$-$C_6$-cycloalkyl, phenyl or benzyl.

10. The pigment preparation as claimed in claim 1, wherein the pigment of formula (1) has a particle size ($d_{50}$) of 30 to 500 nm.

11. The pigment preparation as claimed in claim 1 containing at least one auxiliary selected from the group of fillers, flame retardants, preservatives, photoprotectants, pigmentary and nonpigmentary dispersants, surfactants, antioxidants, resins, waxes, defoamers, antistats and charge control agents.

12. A process for producing a pigment preparation as claimed in claim 1, comprising the steps of mixing the pigment of formula (1) as a powder, granulate, presscake or suspension with at least one copolymer (B) in the presence of water or of an organic solvent or of a mixture of water and organic solvent and isolating the resultant solid form.

13. A pigmented natural or synthetic material pigmented with a pigment formulation as claimed in claim 1.

14. A pigmented article pigmented with a pigment preparation as claimed in claim 1, wherein the pigmented article is selected from the group consisting of wallpaper colors, printing inks, emulsion and gloss colors, electrophotographic toners, electrophotographic developers, ink-jet inks, and color filters.

15. An electrophotographic toner containing 30% to 99.99% by weight of a binder, 0.001% to 50% by weight of the pigment preparation as claimed in claim 1, optionally 0.001% to 50% by weight of a further colorant, optionally 0.01% to 50% by weight of a wax and optionally 0.01% to 50% by weight of a charge control agent, all based on the total weight of the electrophotographic toner.

* * * * *